United States Patent
Trautenberg

(10) Patent No.: US 7,868,822 B2
(45) Date of Patent: Jan. 11, 2011

(54) METHOD AND APPARATUS FOR DETERMINING AN INTEGRITY RISK IN A SATELLITE REFERENCE SYSTEM

(75) Inventor: Hans L. Trautenberg, Ottobrunn (DE)

(73) Assignee: Astrium GmbH, Munich (DE)

( * ) Notice: Subject to any disclaimer, the term of this patent is extended or adjusted under 35 U.S.C. 154(b) by 278 days.

(21) Appl. No.: 12/175,363

(22) Filed: Jul. 17, 2008

(65) Prior Publication Data

US 2010/0033369 A1 Feb. 11, 2010

(30) Foreign Application Priority Data

Jul. 20, 2007 (DE) .................... 10 2007 034 468

(51) Int. Cl.
G01S 19/08 (2010.01)
(52) U.S. Cl. ................................. 342/357.45
(58) Field of Classification Search ............. 342/357.45
See application file for complete search history.

(56) References Cited

U.S. PATENT DOCUMENTS

2005/0246093 A1* 11/2005 Olague et al. ............... 701/207

FOREIGN PATENT DOCUMENTS

WO WO 2005/088332 A2 9/2005

OTHER PUBLICATIONS

Cristina Pecchioni et al., "Combined Galileo and EGNOS Integrity Signal: a multisystem integrity algorithm", XP-002505280, pp. 1-11.
Paolo D'Angelo et al., "GNSS Multi-System Integrity Algorithm Definition and Evaluation", XP-002505281, ION GNSS 20th International Technical Meeting of the Satellite Division, Sep. 25-28, 2007, pp. 3057-3063.
Veit Oehler et al., "Galileo System Design & Performance", XP-002505282, ION GNSS 19th International Technical Meeting of the Satellite Division, Sep. 26-29, 2006, pp. 492-503.
T. Schempp et al., "WAAS Performance Improvements as a Result of WAAS Expansion", XP-002505283, ION GNSS 19th International Technical Meeting of the Satellite Division, Sep. 26-29, 2006, pp. 921-929.
European Search Report dated Dec. 9, 2008 with a partial English translation (Ten (10) pages).
German Office Action dated Mar. 5, 2008 with English translation of relevant portion (Five (5) Pages).
J.T. Wu et al., "An Analysis of Satellite Integrity Monitoring Improvement for WAAS", Proceedings of ION GPS 2002, Sep. 24, 2002, pp. 756-765, Portland, Organ, USA, XP002505283.

* cited by examiner

Primary Examiner—Thomas H Tarcza
Assistant Examiner—Harry Liu
(74) Attorney, Agent, or Firm—Crowell & Moring LLP

(57) ABSTRACT

Methods and apparatus of determining an integrity risk of a satellite reference system are provided. Galileo parameters according to the Galileo integrity concept are detected. The Galileo parameters are imaged onto satellite based augmentation system (SBAS) parameters used in the SBAS. The integrity risk of the satellite reference system is determined according to the SBAS integrity concept using the SBAS parameters.

13 Claims, 2 Drawing Sheets

102

Detecting of Galileo Parameters

104

Mapping of the Galileo Parameters onto SBAS Parameters

106

Determining the Integrity Risk According To the SBAS Concept

METHOD AND APPARATUS FOR DETERMINING AN INTEGRITY RISK IN A SATELLITE REFERENCE SYSTEM

CROSS REFERENCE TO RELATED APPLICATIONS

This application claims priority under 35 U.S.C. §119 to German Patent Application No. 10 2007 034 468.8-35, filed Jul. 20, 2007, the entire disclosure of which is herein expressly incorporated by reference.

BACKGROUND AND SUMMARY OF THE INVENTION

The invention relates to a methods and apparatus for determining an integrity risk for use in a satellite referencing system.

Satellite reference systems, such as the European Galileo Satellite Navigation System (in the following called Galileo System or abbreviated Galileo), currently under construction, have a satellite system comprising a plurality of satellites and an earth-fixed receiving equipment system connected with a central computing station, as well as utilization systems which evaluate and utilize the satellite signals transmitted by the satellites. The satellite signals can be used for position indicating or navigation.

The aviation community is interested in a suitable integrity concept for satellite reference systems. The current integrity concept for Galileo provides the computing of an integrity risk at an alarm threshold value for four different conditions and adding the weighted contribution to the entire integrity risk. When this risk is above a permitted integrity risk, a user is informed by way of an alarm. This concept offers the least conservative assessment of the integrity risk while the continuity and the availability are the highest. However, it is computed by a non-standardized procedure. The integrity concept of Galileo is described in detail in International Patent Document WO 2005/088332 A2.

It is therefore an object of the present invention to provide improved methods and apparatus for determining an integrity risk for satellite reference systems.

One aspect of the present invention now involves permitting a mapping of parameters used in the Galileo integrity concept on the parameters used in the SBAS (Satellite Based Augmentation System). Such an approach meets the wishes of the aviation community which is asking for an integrity concept also for the Galileo system that is identical with the concept used for the SBAS.

One example of an SBAS System is the WAAS (Wide Area Augmentation System). By way of the WAAS, correction signals can be transmitted which permit a more precise position indication. Exemplary embodiments of the present invention reference the SBAS and WAAS concepts and equations.

An integrity risk is the probability that a computed position error during an arbitrary continuous period exceeds a determined threshold value (the "alert limit") and the user is not informed within a determined time period.

A false alarm, thus, an erroneously triggered alarm, always occurs when the estimated SISE (signal in space error) is greater than a defined threshold value and the actual SISE is smaller than the defined threshold value.

The term "signal in space" originates from the task of a satellite navigation system of distributing information via signals in space in order to permit a position determination. In the Galileo System, each satellite emits four ranging signals which, as a function of the respective signal and service, contain ephemeredes, clock parameters, integrity information and other data.

An SISE (signal in space error) is the maximal effect of the error on the distance between the satellite and the user that the signal has when leaving the phase center of the satellite antenna.

A prediction of the precision of the navigation signals is called a "signal in space accuracy" (SISA). The SISA indicates a prediction of the minimal standard deviation of a Gaussian distribution overbounding the distributions of the SISE of all possible user positions in the visibility range of the satellite in the event that no systematic errors occur.

In this case, "bounding" is defined as follows: a distribution of a random variable A is "bounded" by a distribution of a random variable B when, with the probabilities A<−L and for A>+L, the latter is smaller than the sum of the probabilities for B<−L and for B>+L, for all L≠0.

According to an embodiment, exemplary embodiments of the present invention relate to a method of determining an integrity risk in the case of a satellite reference system, which comprises the following steps:

detecting Galileo parameters according to the Galileo integrity concept;
  mapping the Galileo parameters onto SBAS parameters; and
  determining the integrity risk for the satellite reference system according to the SBAS integrity concept using the SBAS parameters.

This approach has the advantage that the standardized WAAS protection level can be used. An integrity concept is therefore made possible, for example, for the Galileo System, which integrity concept is based on the protection level defined for the SBAS.

According to one aspect, the step of detecting may include a detection of the Galileo parameters "signal in space accuracy" (SISA), "signal in space monitoring accuracy" (SISMA) and the probability of a "ranging signal failure". The step of mapping can comprise a computing of a new "signal in space monitored accuracy" (SISMdA) parameter, and the step of determining can comprise using the new SISMdA parameter as a timing and orbiting fraction of the user differential range error (UDRE) in the protection level equations standardized for the SBAS.

Furthermore, for the Galileo integrity concept, a "range error" distribution of faultless satellites can be bounded by a Gaussian distribution with a "zero" mean value and a "signal in space accuracy" (SISA) standard deviation, and a distribution of the difference between the estimated "signal in space error" and the true "signal in space error" can be bounded by a Gaussian distribution with a "zero" mean value and a "signal in space monitoring accuracy (SISMA) standard deviation.

A Gaussian function with a standard deviation SISMdA and a "zero" mean value can be bounded by a weighted sum of the faultless and the faulty distribution of a satellite.

A "range error" distribution of a faulty satellite may be a Gaussian distribution with a standard deviation SISMA and a mean value, which is a prefactor which reflects a permitted error alarm rate multiplied by the square root of the sum of the square of SISMA and the square of SISA.

According to another aspect, two-frequency "ranging signals" can be used, and an ionospheric contribution of the WAAS equations can be correspondingly adapted to the Galileo equations.

According to a further aspect, the present invention relates to a computer program for the implementation of a method according to an embodiment of the present invention and to a computer program product containing a machine-readable program carrier on which the computer program can be stored in the form of electronically and/or optically readable control signals.

According to another aspect, the present invention relates to an apparatus for determining an integrity risk in the case of a satellite reference system, having the following characteristics:

a device that detects Galileo parameters according to the Galileo integrity concept;

a device that maps the Galileo parameters onto SBAS parameters; and a device that determines the integrity risk for the satellite reference system according to the SBAS integrity concept using the SBAS parameters.

Additional advantages and application possibilities of the present invention are indicated in the following description in connection with the exemplary embodiments illustrated in the drawings. The drawings are a flow chart of a method of determining an integrity risk and a block diagram of an apparatus for determining an integrity risk according to an embodiment of the present invention.

In the following, identical and/or functionally identical elements may be provided with the same reference symbols. The absolute values and dimensional specifications are only examples and represent no restriction of the invention to such dimensions.

Other objects, advantages and novel features of the present invention will become apparent from the following detailed description of the invention when considered in conjunction with the accompanying drawings.

The satellite reference system may be the Galileo System to whose integrity concept reference is made.

DETAILED DESCRIPTION OF THE DRAWINGS

Figure 1A:
FIG. 1A is a flow chart of a method of determining an integrity risk of a satellite reference system according to an embodiment of the present invention.
Figure 1A:
Figure 1A:
Figure 1B:
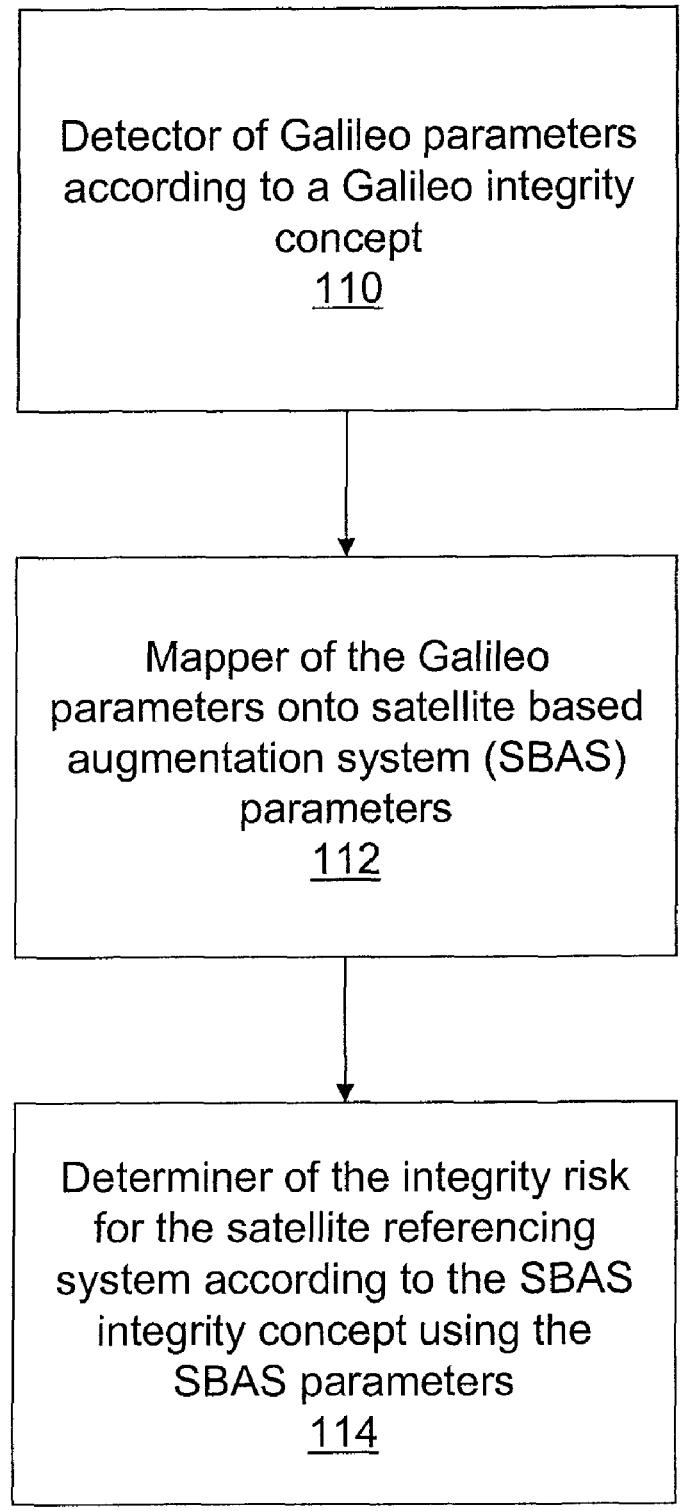
FIG. 1B is a block diagram of an apparatus for determining an integrity risk of a satellite reference system according to an embodiment of the present invention.

FIG. 1A is a flow chart of a method of determining an integrity risk of a satellite reference system according to an embodiment of the present invention. The method of determining an integrity risk comprises a step of detecting 102 Galileo parameters according to the Galileo integrity concept, a step of mapping 104 the Galileo parameters onto SBAC parameters used in the SBAS and a step of determining 106 the integrity risk according to the SBAS concept using the SBAS parameters. FIG. 1B is a block diagram of an apparatus for determining an integrity risk of a satellite reference system according to an embodiment of the present invention. The apparatus comprises a device 110 that detects Galileo parameters according to the Galileo integrity concept, a device 112 that maps the Galileo parameters onto SBAS parameters, and a device 114 that determines the integrity risk for the satellite reference system according to the SBAS integrity concept using the SBAS parameters. Devices 110-114 can be embodied in a processor, such as a microprocessor executing a computer program to perform various functions, an application specific integrated circuit (ASIC), field programmable gate array and/or the like. These devices can be separate devices or can be embodied in a single device.

For the Galileo integrity concept, the "range error" distribution of faultless satellites can be overbounded by a Gaussian distribution with a "zero" mean value and a "signal in space accuracy" standard deviation. The distribution of the difference between the estimated "signal in space error" and the true "signal in space error" is bounded by a Gaussian distribution with a "zero" mean value and a "signal in space monitoring accuracy" standard deviation. The probability that an individual satellite is faulty is called p_fail_sat.

In order to permit the use of the simple protection level equations standardized for the SBAS, a new parameter "signal in space monitored accuracy" (SISMdA) is defined. A Gaussian function with a SISMdA standard deviation and a "zero" mean value is bounded by a weighted sum of the faultless and the faulty distribution of a satellite. The weighting factor for the faultless distribution is 1-p_fail_sat, while the weighting factor for the faulty distribution is p_fail_sat. The "range error" distribution of the faulty satellite is a Gaussian distribution with a standard deviation SISMA and a mean value, which is a prefactor k_fa, which reflects the permitted error alarm rate multiplied by the square root of the sum of the square of SISMA and the square of SISA.

This new parameter can be used as the orbiting and timing fraction of the UDRE by the WAAS protection level equations. When two-frequency "ranging signals" are used, the ionospheric contribution of the WAAS equations are correspondingly adapted to the Galileo equations.

According to exemplary embodiments of the present invention, a new "signal in space monitored accuracy" parameter therefore can be computed from the "signal in space accuracy" (SISA), the "signal in space monitoring accuracy" (SISMA) and the probability of a "ranging signal failure". The new parameter can be used as a timing and orbiting fraction of the UDRE in the SBAS protection level equations.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of determining an integrity risk of a satellite reference system comprising the steps of:

detecting Galileo parameters according to a Galileo integrity concept;

mapping the Galileo parameters onto satellite based augmentation system (SBAS) parameters, and determining the integrity risk for the satellite reference system according to the SBAS integrity concept using the SBAS parameters.

2. The method according to claim 1, wherein the step of detecting involves detecting of the Galileo parameters' signal in space accuracy (SISA), signal in space monitoring accuracy (SISMA) and of a probability of a ranging signal failure, the step of mapping comprises computing a signal in space monitored accuracy (SISMdA) parameter, and the step of determining comprises using the SISMdA parameter as a timing or orbiting fraction of the user differential range error (UDRE) in protection level equations standardized for the SBAS.

3. The method according to claim 1, wherein a range error distribution of faultless satellites is bounded by a Gaussian distribution with a zero mean value and a signal in space accuracy (SISA) standard deviation, and a distribution of the difference between an estimated signal in space error and an actual true signal in space error is bounded by a Gaussian distribution with a zero mean value and a signal in space monitoring accuracy (SISMA) standard deviation.

4. The method according to claim 1, wherein a Gaussian function with a standard deviation SISMdA and a zero mean value bounds a weighted sum of a faultless and faulty distribution of a satellite.

5. The method according to claim 4, wherein a range error distribution of a faulty satellite is a Gaussian distribution with a standard deviation SISMA and a mean value, which is a prefactor k_fa reflecting a permitted error alarm rate multiplied by a square root of a sum of a square of SISMA and a square of SISA.

6. The method according to claim 1, wherein two-frequency ranging signals are used and an ionospheric contribution of wide area augmentation system (WAAS) equations is correspondingly adapted to the Galileo equations.

7. A computer program comprising a computer-readable program carrier that stores a computer program for:
   detecting Galileo parameters according to a Galileo integrity concept;
   mapping the Galileo parameters onto satellite based augmentation system (SBAS) parameters, and
   determining the integrity risk for the satellite reference system according to the SBAS integrity concept using the SBAS parameters.

8. An apparatus for determining an integrity risk of a satellite reference system, the system comprising:
   a device that detects Galileo parameters according to a Galileo integrity concept;
   a device that maps the Galileo parameters onto satellite based augmentation system (SBAS) parameters; and
   a device that determines the integrity risk for the satellite reference system according to the SBAS integrity concept using the SBAS parameters.

9. The apparatus according to claim 8, wherein
   the detection involves detecting of the Galileo parameters' signal in space accuracy (SISA), signal in space monitoring accuracy (SISMA) and of a probability of a ranging signal failure,
   the mapping comprises computing a signal in space monitored accuracy (SISMdA) parameter, and
   the determining comprises using the SISMdA parameter as a timing or orbiting fraction of the user differential range error (UDRE) in protection level equations standardized for the SBAS.

10. The apparatus according to claim 8, wherein a range error distribution of faultless satellites is bounded by a Gaussian distribution with a zero mean value and a signal in space accuracy (SISA) standard deviation, and a distribution of the difference between an estimated signal in space error and an actual true signal in space error is bounded by a Gaussian distribution with a zero mean value and a signal in space monitoring accuracy (SISMA) standard deviation.

11. The apparatus according to claim 8, wherein a Gaussian function with a standard deviation SISMdA and a zero mean value bounds a weighted sum of a faultless and faulty distribution of a satellite.

12. The apparatus according to claim 11, wherein a range error distribution of a faulty satellite is a Gaussian distribution with a standard deviation SISMA and a mean value, which is a prefactor k_fa reflecting a permitted error alarm rate multiplied by a square root of a sum of a square of SISMA and a square of SISA.

13. The apparatus according to claim 8, wherein two-frequency ranging signals are used and an ionospheric contribution of wide area augmentation system (WAAS) equations is correspondingly adapted to the Galileo equations.

* * * * *